(12) United States Patent
Hack et al.

(10) Patent No.: US 10,946,522 B2
(45) Date of Patent: Mar. 16, 2021

(54) DIGITAL METHOD AND AUTOMATED ROBOTIC SETUP FOR PRODUCING VARIABLE-DENSITY AND ARBITRARY SHAPED METALLIC MESHES

(71) Applicant: ETH ZÜRICH, Zürich (CH)

(72) Inventors: Norman Peter Hack, Zürich (CH); Nitish Kumar, Oberengstringen (CH); Jonas Buchli, Zürich (CH); Matthias Kohler, Riedikon (CH); Fabio Matteo Gramazio, Zürich (CH)

(73) Assignee: ETH ZURICH, Zürich (CH)

( * ) Notice: Subject to any disclaimer, the term of this patent is extended or adjusted under 35 U.S.C. 154(b) by 214 days.

(21) Appl. No.: 16/082,777

(22) PCT Filed: Mar. 10, 2017

(86) PCT No.: PCT/EP2017/055639
§ 371 (c)(1),
(2) Date: Sep. 6, 2018

(87) PCT Pub. No.: WO2017/153559
PCT Pub. Date: Sep. 14, 2017

(65) Prior Publication Data
US 2019/0077020 A1    Mar. 14, 2019

(30) Foreign Application Priority Data
Mar. 10, 2016   (EP) ..................................... 16159663

(51) Int. Cl.
*B21F 27/10* (2006.01)
*B21F 27/12* (2006.01)
(Continued)

(52) U.S. Cl.
CPC ............. *B25J 9/1669* (2013.01); *B21F 27/10* (2013.01); *B21F 27/12* (2013.01); *B25J 9/162* (2013.01);
(Continued)

(58) Field of Classification Search
CPC .......... B21F 27/12; B25J 9/162; B25J 9/1669; B25J 9/1671; B25J 9/1687; B25J 11/005
See application file for complete search history.

(56) References Cited

U.S. PATENT DOCUMENTS

| | | | | |
|---|---|---|---|---|
| 5,446,254 A * | 8/1995 | Ritter | ...................... | B21F 27/14 |
| | | | | 219/56 |
| 10,094,114 B2 * | 10/2018 | Kruger | ................... | B21F 27/10 |

(Continued)

FOREIGN PATENT DOCUMENTS

| | | |
|---|---|---|
| CN | 1171709 C | 10/2004 |
| WO | 2015034438 A1 | 3/2015 |
| WO | 2015082115 A1 | 6/2015 |
| WO | 2017067857 A1 | 4/2017 |

OTHER PUBLICATIONS

Jun. 9, 2017 Search Report issued in International Patent Application No. PCT/EP2017/055639.

*Primary Examiner* — Robert T Nguyen
(74) *Attorney, Agent, or Firm* — Oliff PLC (57) ABSTRACT

A mobile manufacturing device and a method for producing three-dimensional lattice or mesh structures, wherein the mobile manufacturing device is a mobile device adapted to move along a three-dimensional structure to be produced, in particular while performing both translation and rotation movements in three-dimensional space, and wherein the mobile manufacturing device includes a means for detection of its position relative to the dimensional structure to be (Continued)

produced, so that the mobile manufacturing device is able to produce the three-dimensional structure as an autonomous robot.

2 Claims, 14 Drawing Sheets

(51) Int. Cl.
  *B25J 11/00* (2006.01)
  *B25J 9/16* (2006.01)
(52) U.S. Cl.
  CPC .......... *B25J 9/1671* (2013.01); *B25J 9/1687* (2013.01); *B25J 11/005* (2013.01)

(56) References Cited

U.S. PATENT DOCUMENTS

| | | | |
|---|---|---|---|
| 2011/0301744 A1* | 12/2011 | Ichimaru | B25J 9/1687 |
| | | | 700/214 |
| 2016/0207220 A1* | 7/2016 | Hack | B25J 5/005 |
| 2017/0157664 A1* | 6/2017 | Pettersson | B21F 23/005 |
| 2017/0203468 A1* | 7/2017 | Sherman | E04C 5/00 |
| 2017/0254084 A1* | 9/2017 | Rapperstorfer | B28B 23/028 |
| 2018/0036788 A1* | 2/2018 | Stevens | B21F 23/005 |
| 2018/0333764 A1* | 11/2018 | Rapperstorfer | B25J 9/1682 |
| 2019/0002345 A1* | 1/2019 | Bruske | B29C 65/5085 |

* cited by examiner

DIGITAL METHOD AND AUTOMATED ROBOTIC SETUP FOR PRODUCING VARIABLE-DENSITY AND ARBITRARY SHAPED METALLIC MESHES

TECHNICAL FIELD

This invention describes a method and a robotic setup for the digital fabrication of three-dimensional meshes, in particular freeform, volumetric metallic meshes with variable density. Specific applications include concrete formwork and reinforcement but can find use in other construction purposes as well.

BACKGROUND

Problem Description

Metal meshes are used for a wide variety of applications, ranging from lightweight structural components to reinforcements of composite building structures or scaffolding and substructures. These meshes mainly follow simple rectangular or single curved geometries as currently metal meshes can only be produced economically as planar two-dimensional mats with equally spaced cell sizes. In order to meet the demand for complex construction geometries and to therefore enable the fabrication of non-standard, structurally optimized steel reinforced concrete structures, three-dimensionally shaped metal meshes are required. To create three-dimensional metal meshes out of a continuous metal wire in an automated manner, it is required to integrate metal wire straightening, bending, feeding, cutting and welding within a digitally-controlled process that allows for a) variable mesh geometries and b) automated manufacturing.

State of the Art

Previously, geometrically complex, three-dimensional metal meshes were difficult to produce. Mainly two approaches were applied:

In the first approach, the single wires are bent, assembled and subsequently welded together. Only one surface is fabricated at a time. Successive steps are needed in order to create such three-dimensional mesh structures.

The second strategy to manufacture three-dimensional mesh structures starts exactly at this point. Two flat steel mats or steel meshes are connected by spacers at a certain distance in order to obtain a three-dimensional mesh. Since the automatic production of the initial mesh faces is usually limited to planar surfaces, also the resulting meshes are constrained to planar geometries, such as, for example, volumetric sandwich meshes (see for example CN 1171709 C, "Productive method and apparatus for 3D cross-linked sandwich screen plate").

SUMMARY

In an embodiment, there is provided a method for producing three-dimensional, highly variable lattice or mesh structures by means of a mobile manufacturing device, wherein the mobile manufacturing device is moved on a two-dimensional plane, and manufactured by means of an end-effector, a three-dimensional lattice or mesh structure by providing wires in horizontal as well as in non-horizontal orientation and at least one of bending and connecting a plurality of these wires, the method comprising: laying down some wires horizontally at defined vertical distances and in prescribed lengths in three-dimensional space, bending the laid horizontal wires at prescribed points by prescribed angles, grasping and feeding other wires vertically in discrete steps of varying lengths, controlling with the mobile manufacturing device a spatial arrangement of the horizontal wires and the vertical wires using a three-dimensional parametric model, forming cross-wire connections by bringing the horizontal wires and the vertical wires together, welding the cross-wire connections together to form cross-wire joints, and cutting the vertical wires at varying lengths.

BRIEF DESCRIPTION OF THE DRAWINGS

The invention is described by means of the enclosed figures showing preferred embodiments of the invention.

DETAILED DESCRIPTION

Figure 1:
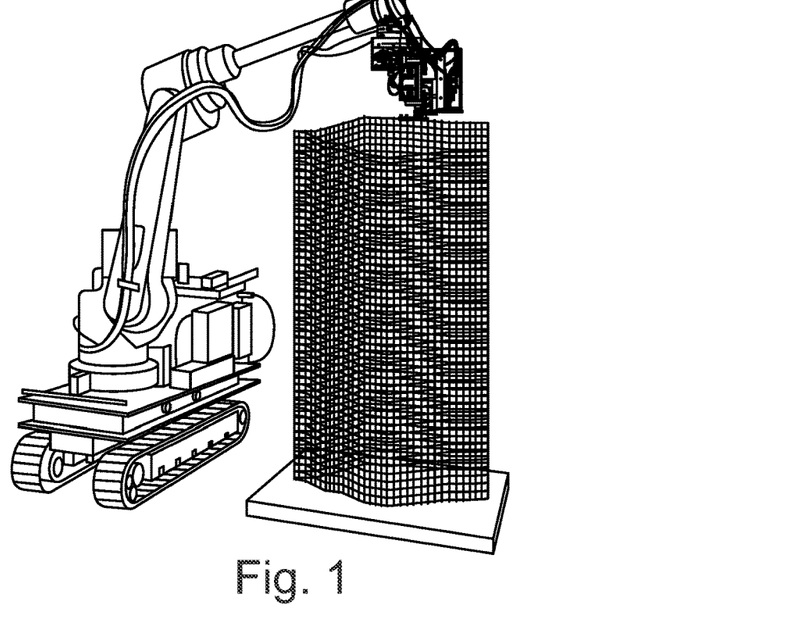
FIGS. 1 and 2 show photographs of the mobile manufacturing device according to the invention as well as of its specialised end-effector.
Figure 2:
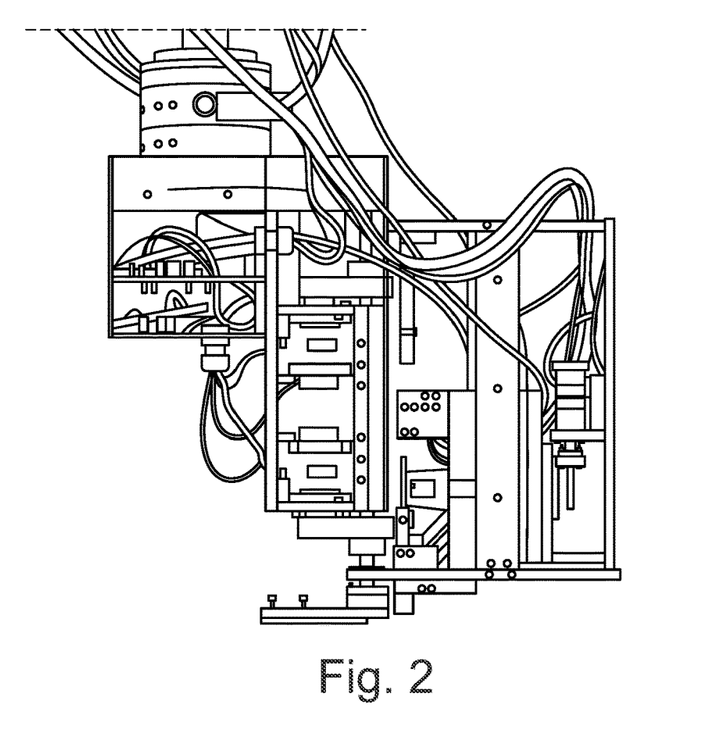
Figure 3:
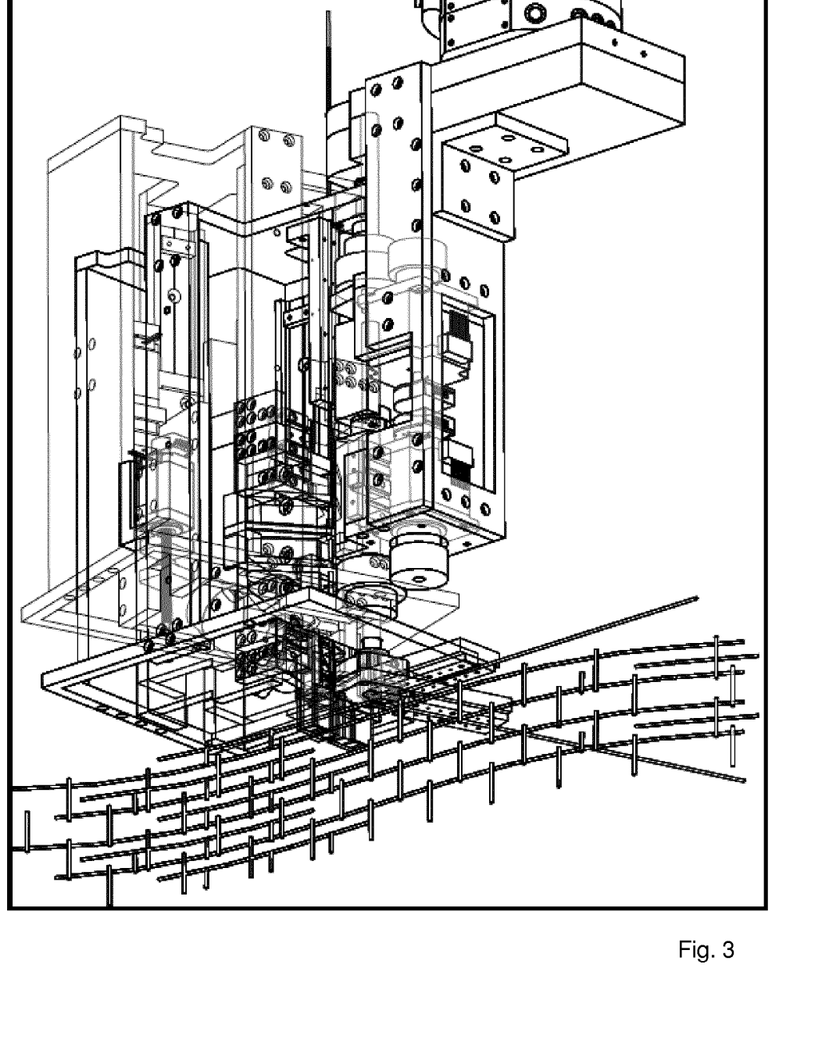
FIGS. 3 and 4 show the end-effector producing a three-dimensional mesh.
Figure 4:
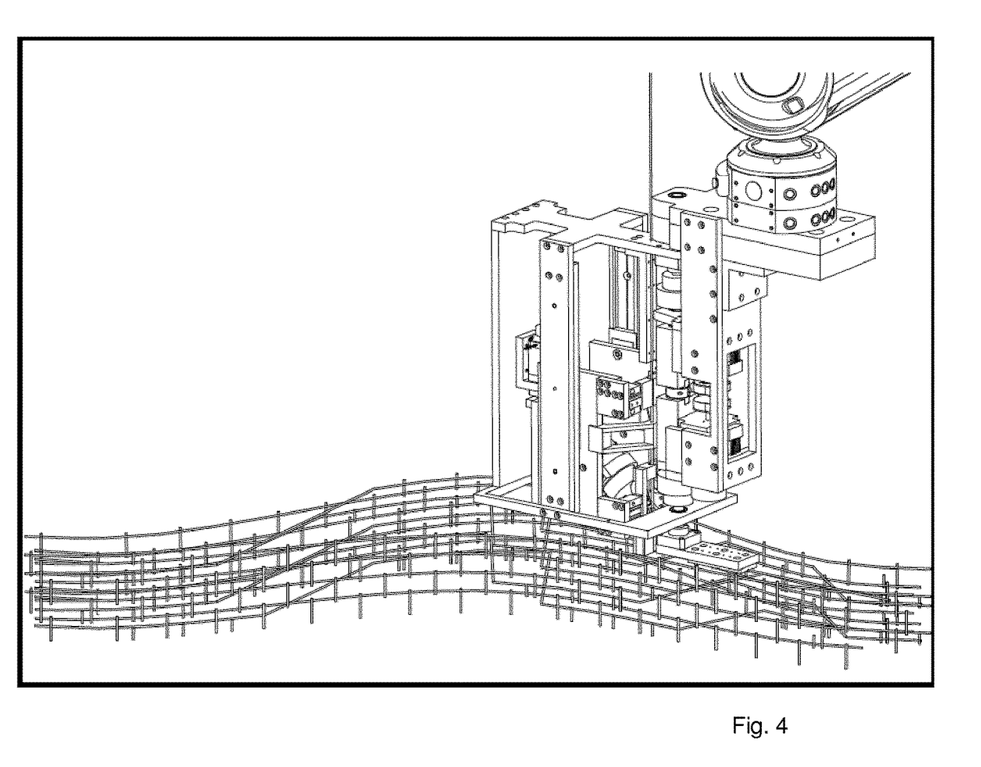
Figure 5:
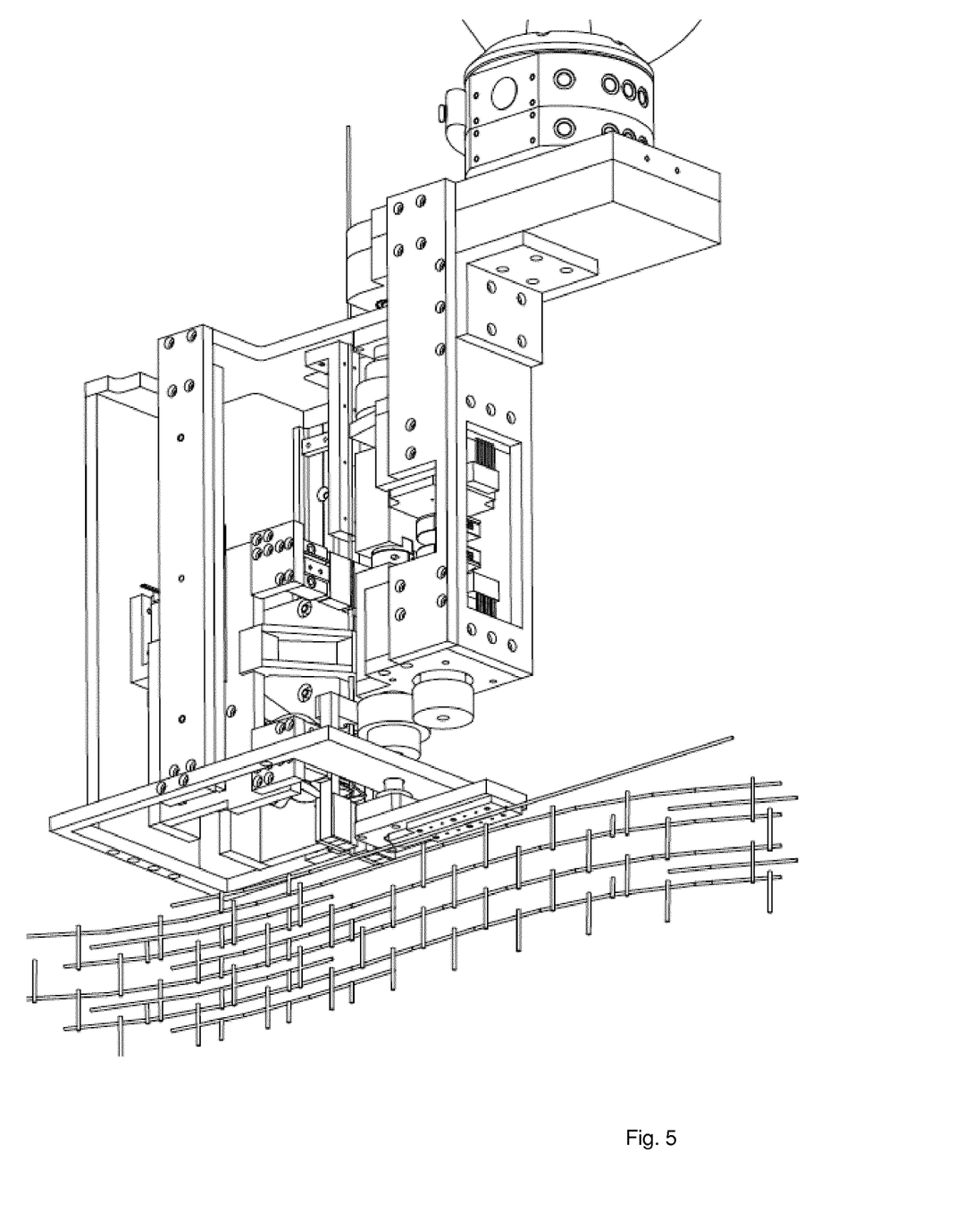
FIGS. 5, 6, 7, 8, 9, 10, 11, 12, 13, 14 and 15 show an end-effector producing three-dimensional mesh, wherein the single figures show details of the respective steps of the method for producing three-dimensional, highly variable lattice or mesh structures, as grasping and feeding wires, positioning wires, cutting wires, bending wires, welding wires, straightening of wires.
Figure 6:
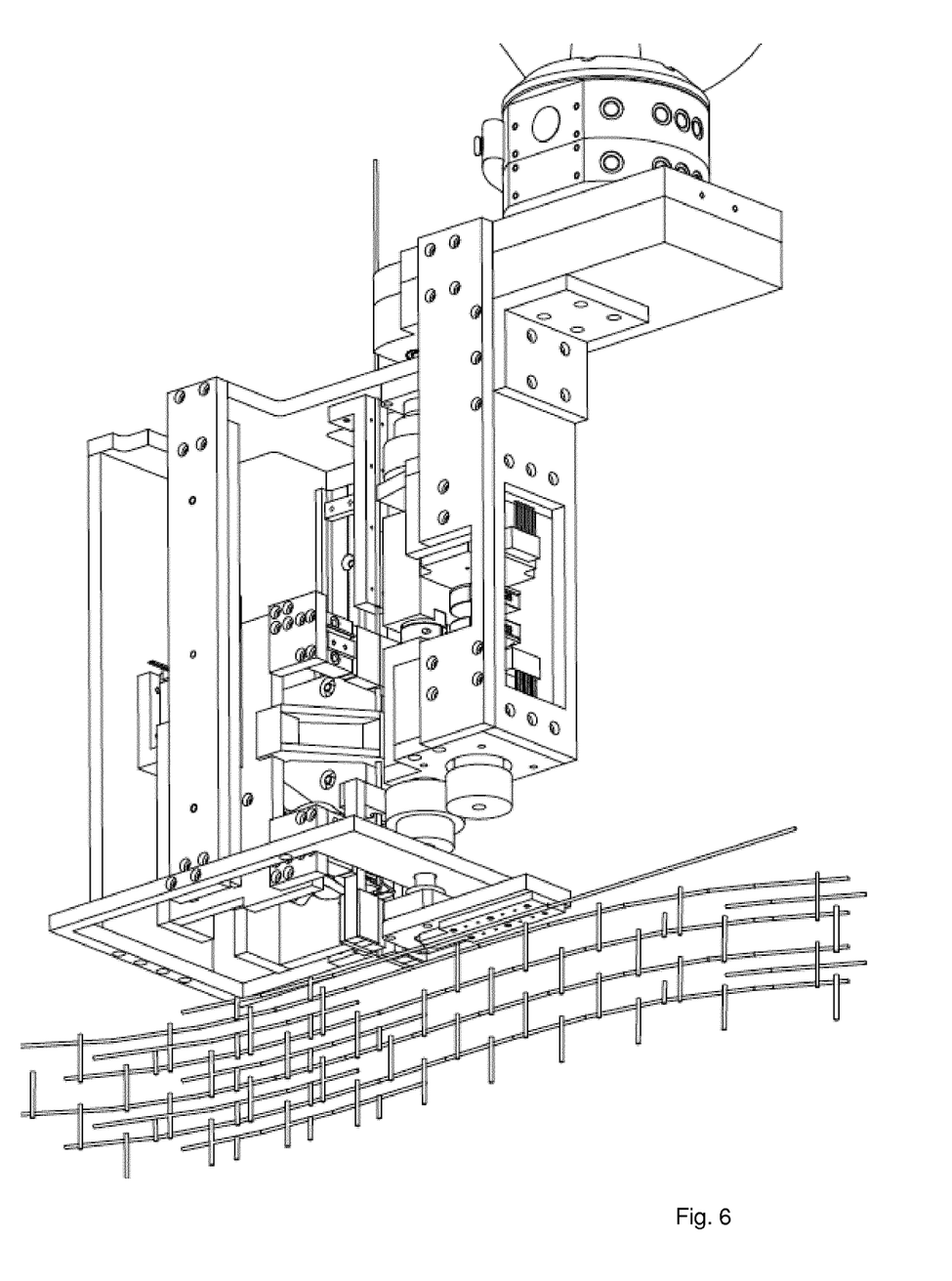
Figure 7:
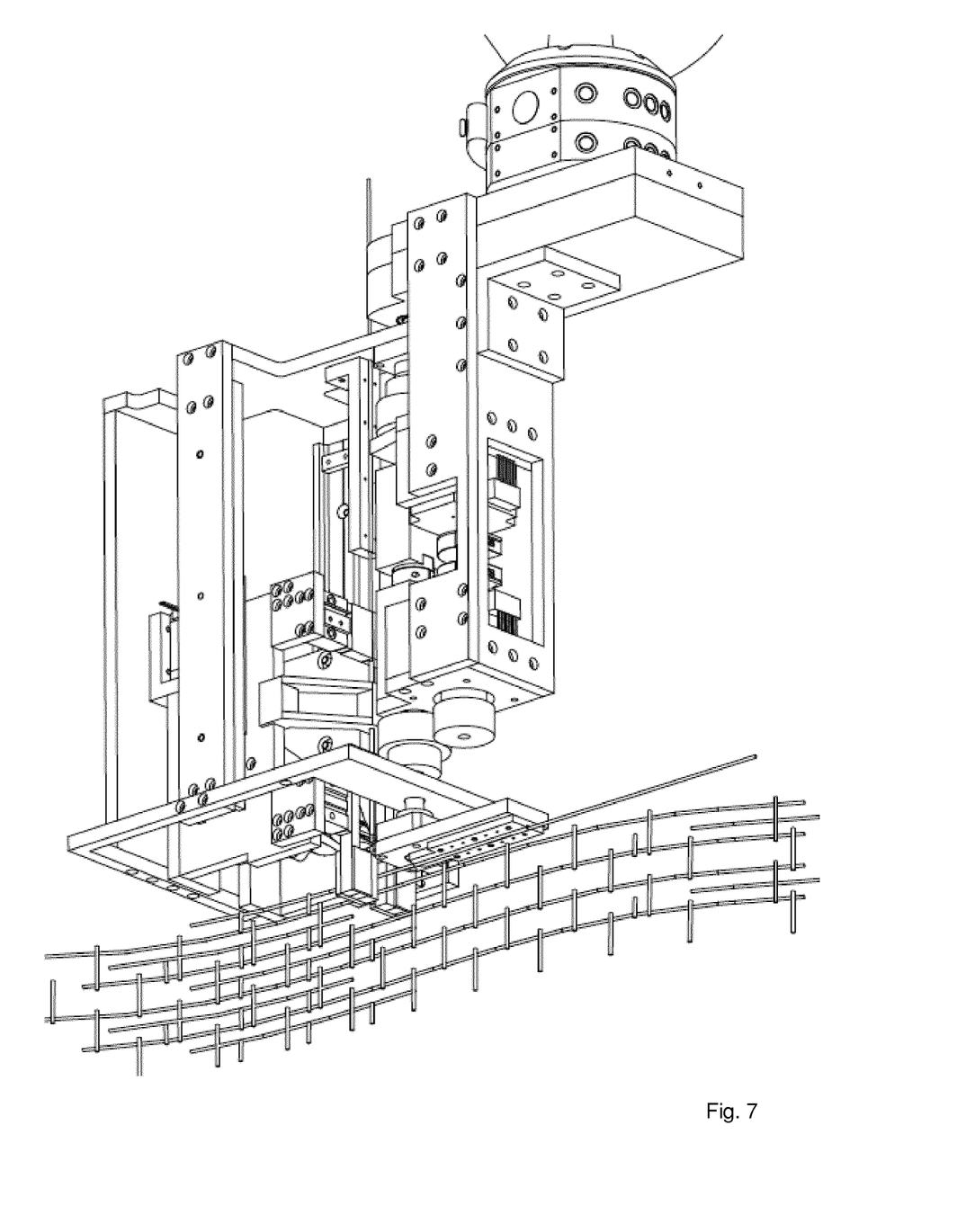
Figure 8:
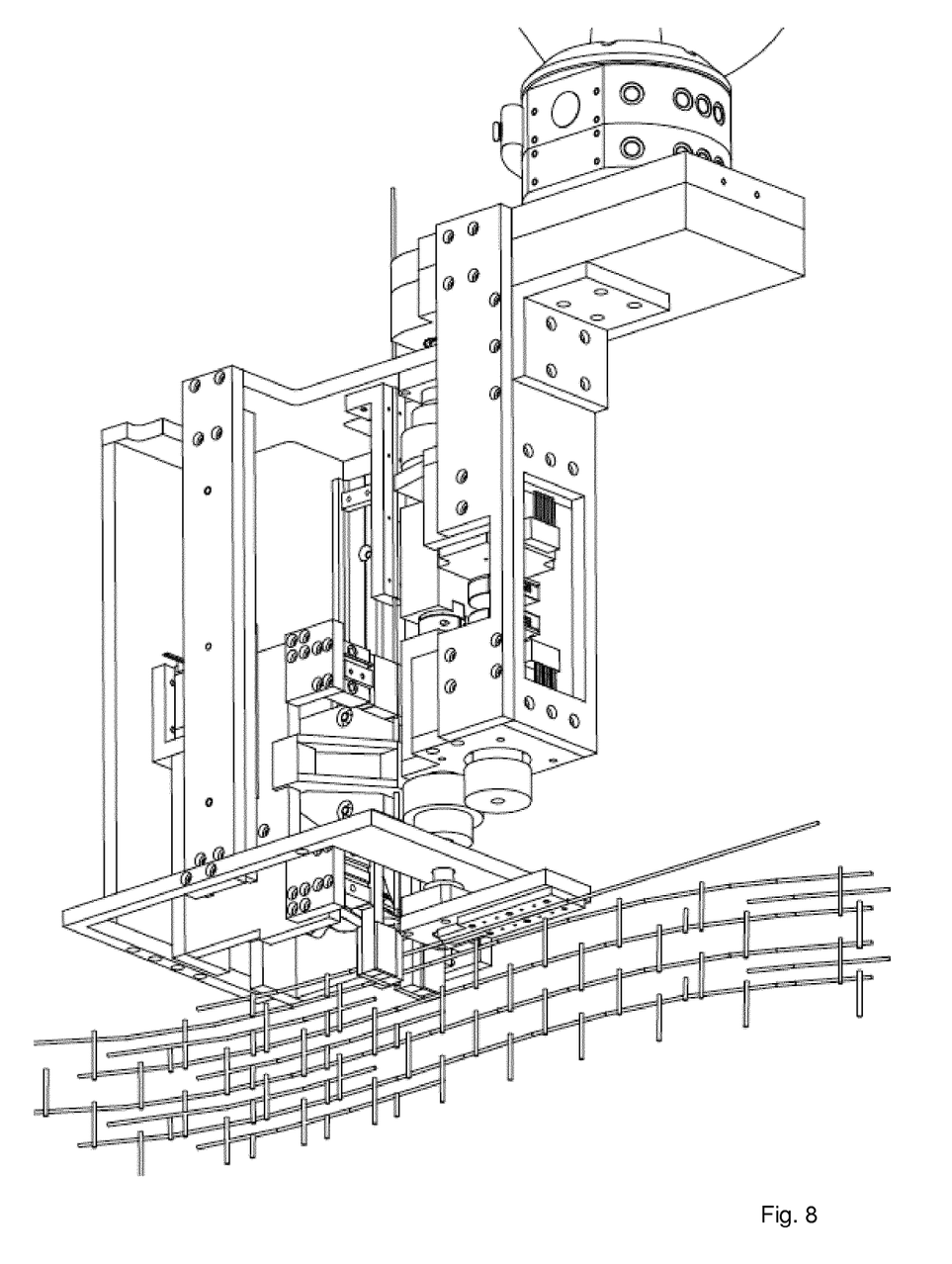
Figure 9:
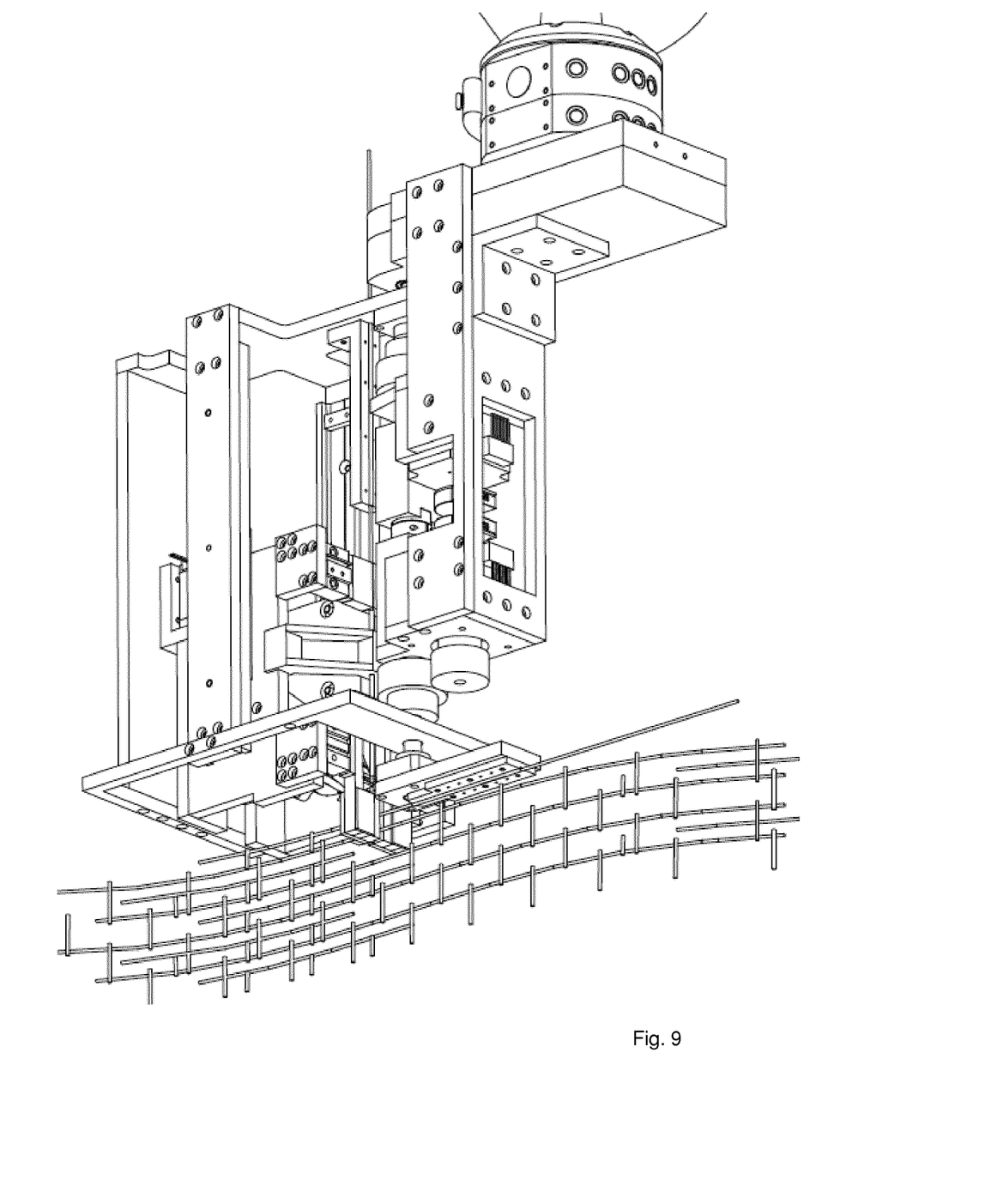
Figure 10:
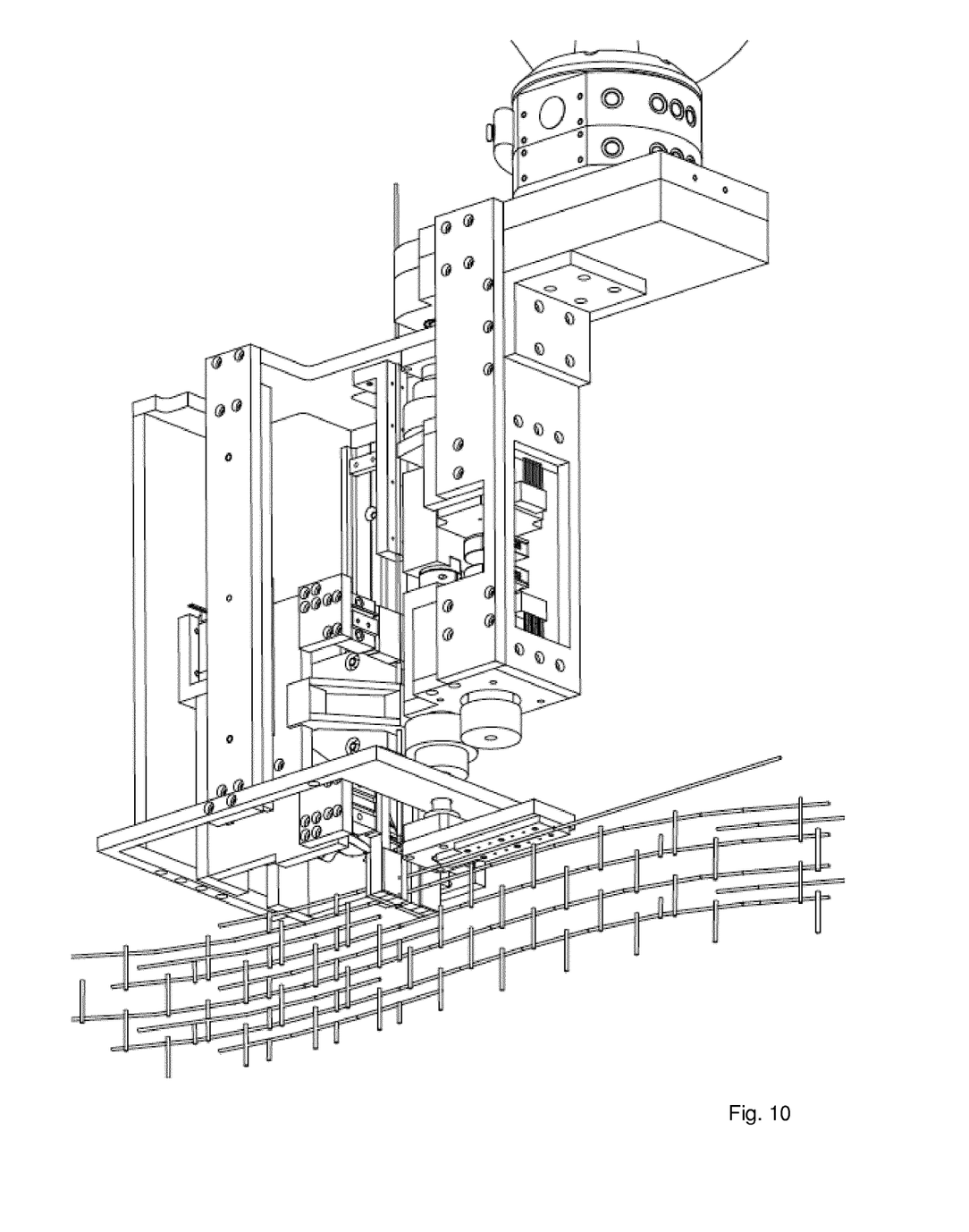
Figure 11:
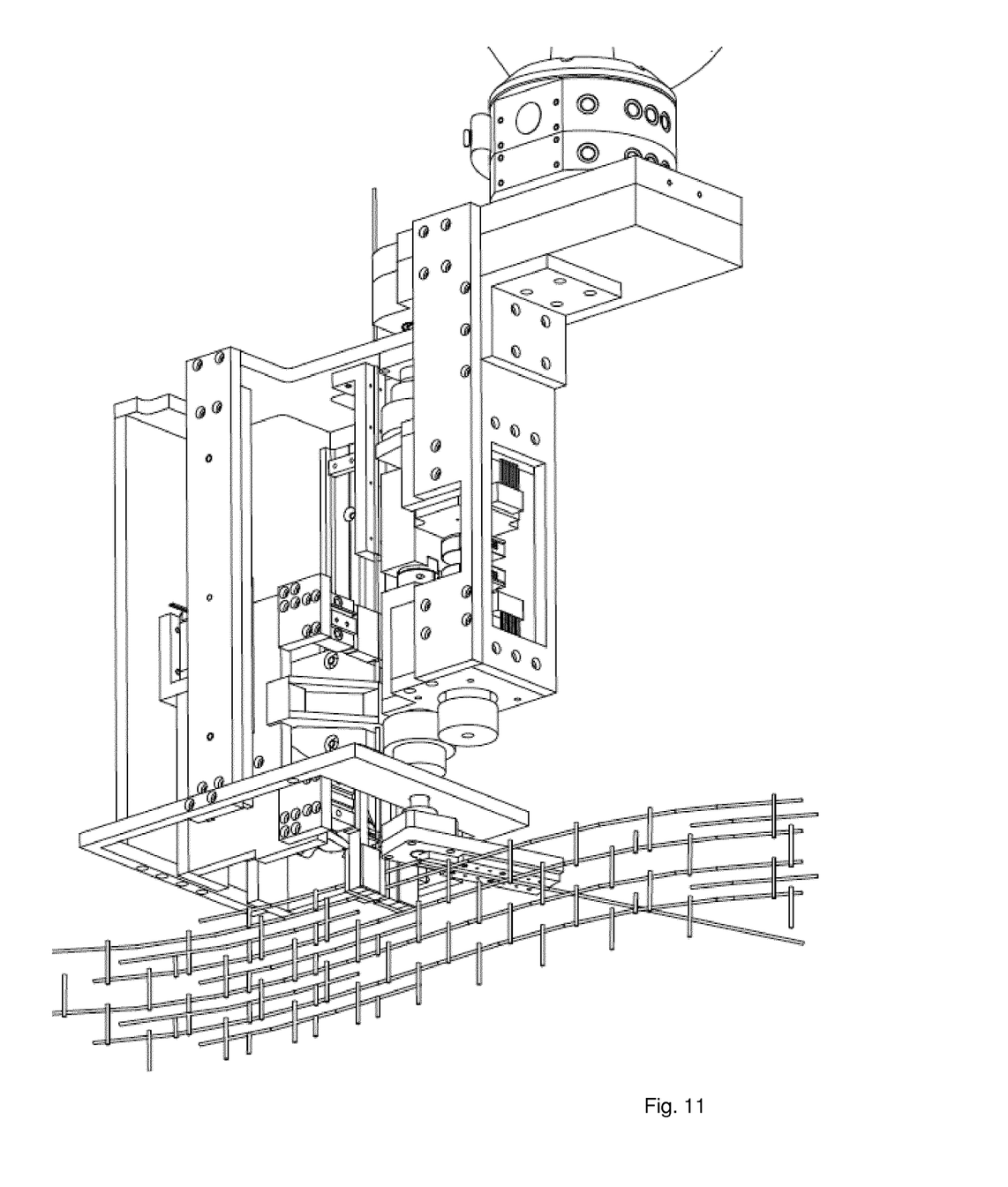
Figure 12:
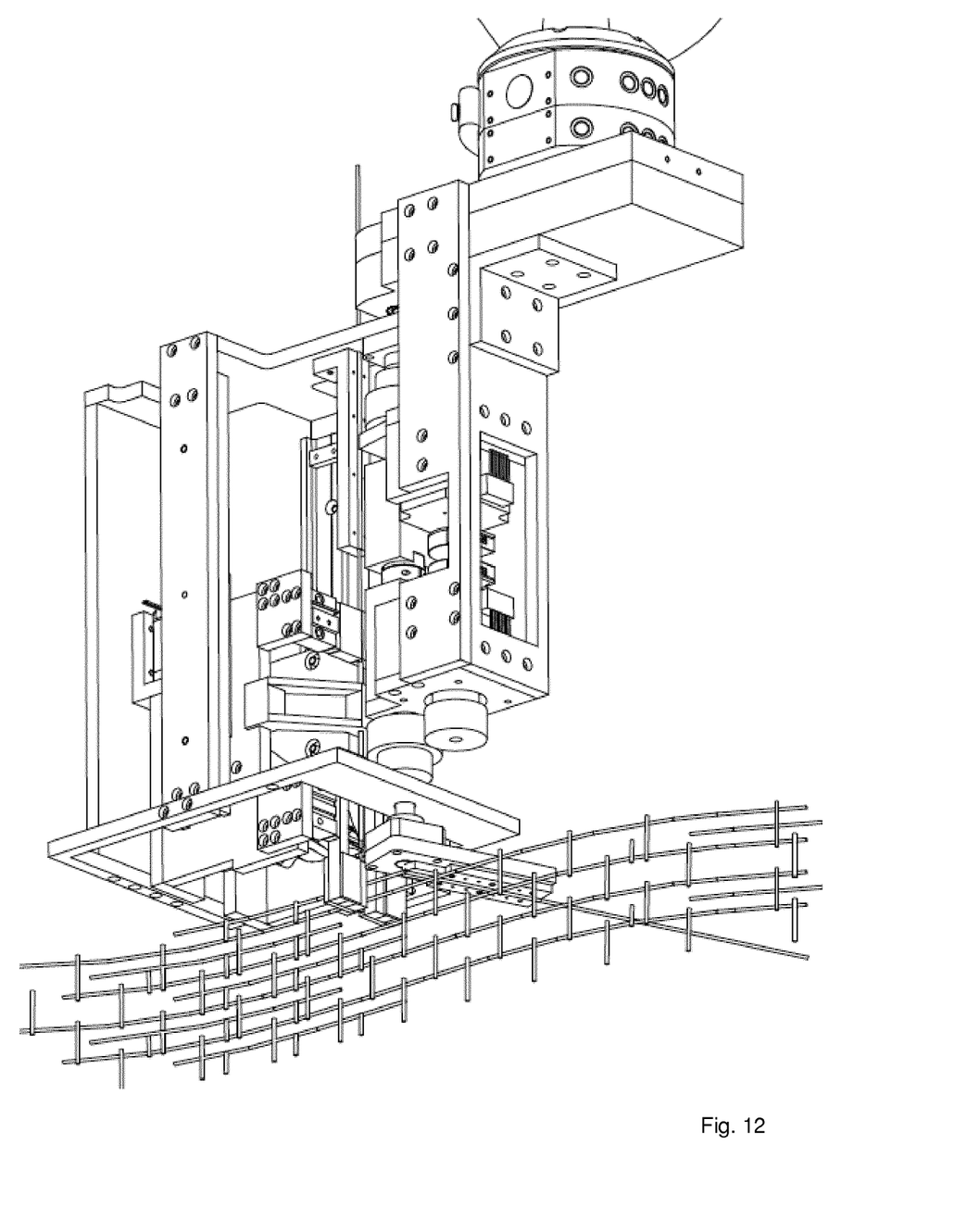
Figure 13:
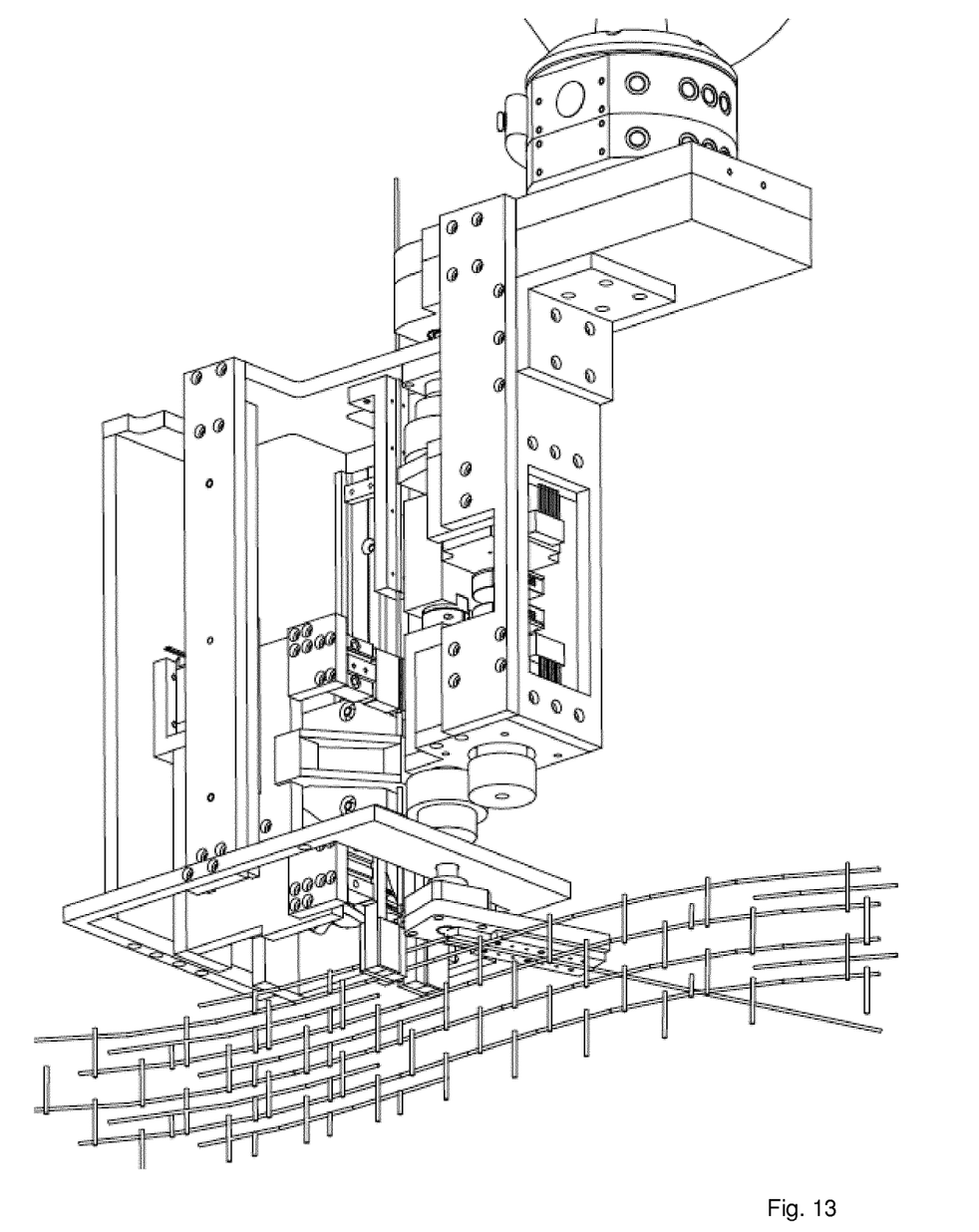
Figure 14:
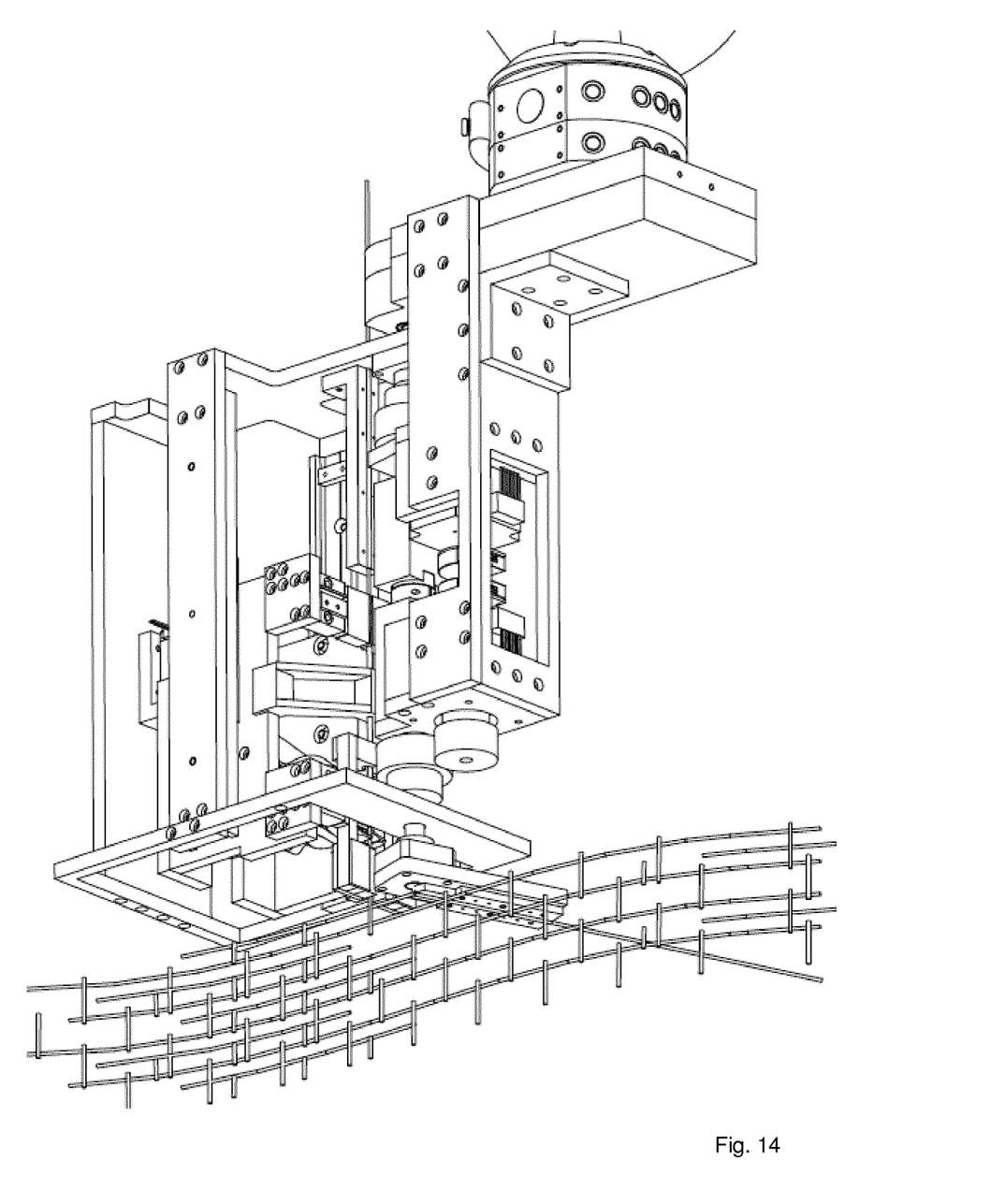
Figure 15:
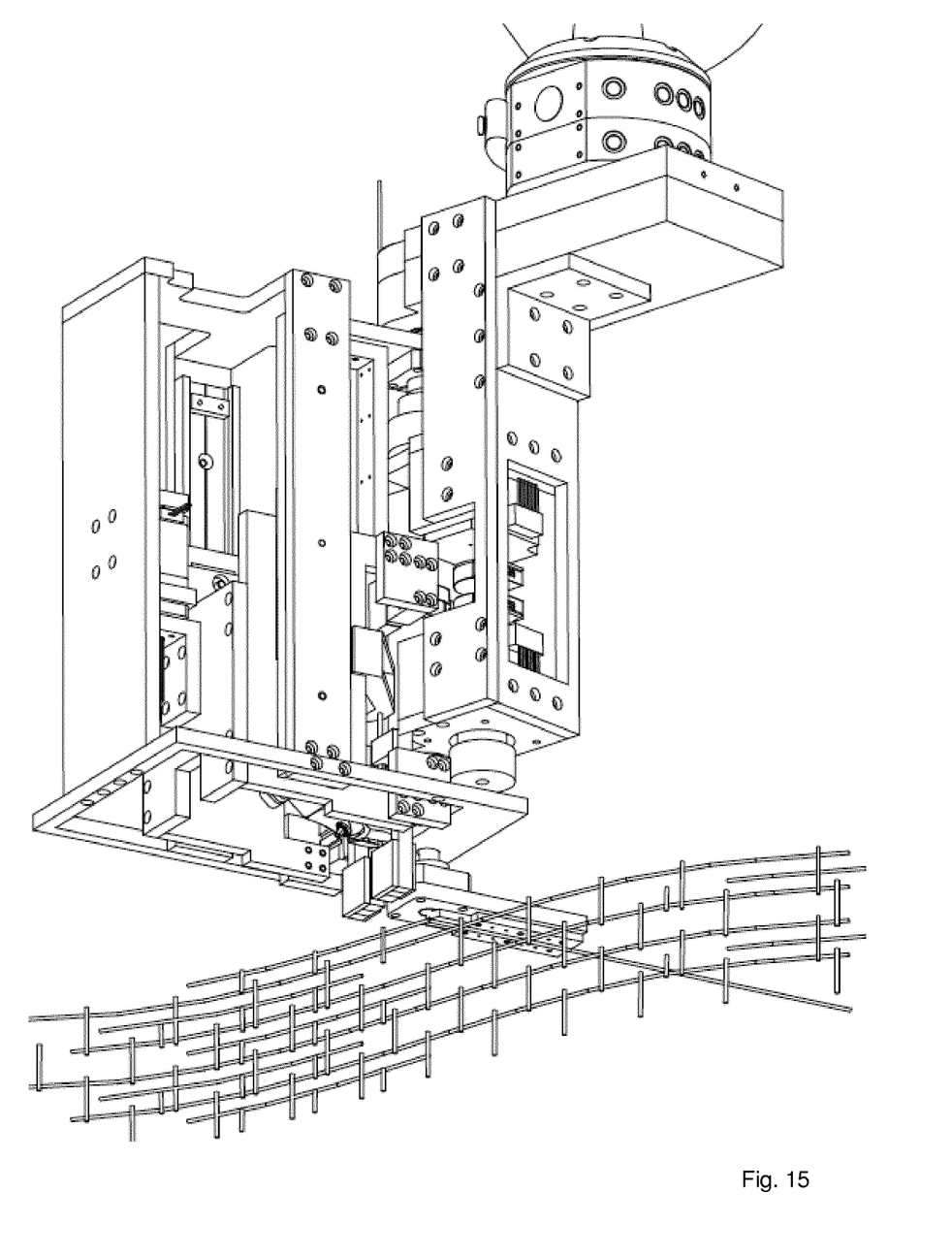

An aspect of the invention described here is a robotic setup including a custom multifunctional robotic end-effector that facilitates the digitally controlled fabrication of three-dimensional metal meshes with locally and globally varying volume, curvature and cell size.

A further aspect of the invention is a digital process to produce three-dimensional metallic meshes, of varying shapes and density, and the robotic setup which automates this digital process. Overall, the novelty of the invention not only lies in the robust integration of key subfunctionalities like wire straightening, feeding, bending, cutting and cross wire welding of the proposed method and setup into a single, robotically guided and digitally controlled end-effector mounted on a mobile robotic manipulator but also in the sequence in which they are executed. Whereas in current applications the machine is static and the building element moves through the machine, here preferably the building element remains static and the machine (robotic setup) moves in order to fabricate the structure. This inversion significantly increases the range of geometries that can be fabricated and imposes fewer restrictions on the achievable size of the structure being built. In turn, the proposed method and end-effector setup is also transferable to stationary robotic machinery (e.g. automated prefabrication). A further aspect of the invention is a digital design and control process to robotically produce three-dimensional metallic meshes, of varying volume, shape and density, which allows a complete digital parameterization of a mesh geometry—including overall dimension, shape and global/local geometric manipulation—and to export specific design data sets and to directly transfer it to a robotic control system. As a consequence, this allows to automatically (design and) fabrication variable, non-standard three-dimensional meshes, which can be used in particular as concrete reinforcements or lost formwork (or as a combination of these two).

The invention comprises the following possible characteristics of the autonomous mobile manipulator and the autonomous mesh building method:

1. The autonomous mobile manipulator, as a first step, lays down the metal wires horizontally at defined vertical distances and in prescribed lengths in three-dimensional space. This can be achieved through the use of a mobile manipulator (e.g. a robotic arm), which can guide and lay the horizontal wires at prescribed vertical distance to a prescribed length.
2. The self-contained end-effector of the autonomous mobile manipulator provides for an actuated axis of rotation, which can bend these laid horizontal wires, from step 1, at prescribed points by prescribed angles. This can be achieved by a user-defined end-effector attached to the above mobile manipulator, which provides for an actuated axis of rotation and controls the magnitude of wire bending.
3. The self-contained end-effector of the autonomous mobile manipulator includes a mechanism to grasp and feed wires vertically in discrete steps of varying lengths.
4. The spatial arrangement of the horizontal wires from step 1 and vertical wires from step 3, dictated by the 3-dimensional parametric model, is controlled and manufactured by the mobile manipulator.
5. The self-contained end-effector of the autonomous mobile manipulator provides for a mechanism to bring the horizontal wires, from step 1, and vertical wires, from step 3, together to form cross-wire connections.
6. The self-contained end-effector of the autonomous mobile manipulator includes a mechanism to automatically weld the cross-wire connections together to form cross-wire joints.
7. The self-contained end-effector of the autonomous mobile manipulator includes a wire cutting mechanism, which can cut the vertical wires, from step 3, at varying lengths.
8. By repeating steps from 1-7, mesh with varying length, height and varying local, global curvature can be fabricated in an automated manner. This is made possible by self-localization of the mobile manipulator as it changes its position and orientation while building the mesh.
9. The mobile manipulator may comprise on-board sensing, for example cameras, which can detect the curvature of the actually built mesh locally and/or globally and autonomously realign the mesh geometry and correct for any deviations from the given parametric model of the mesh and/or occurring unmodeled material effects.
10. Arbitrary length of the mesh can be fabricated in an automated manner. This is made possible by self-localization of the mobile manipulator as it changes its position and orientation while building the mesh.

Preferably, the mobile manufacturing device comprises a specialised end-effector which is adapted to move along a three-dimensional structure to be produced and is adapted to carry out at least some of the steps of the method for producing three-dimensional, highly variable lattice or mesh structures according to the invention.

Advantages

Based on a parametric three-dimensional model of the mesh, for which its local and global curvature, its height and length can be varied, a custom control software generates motion commands for the robotic setup which comprises of a mobile manipulator and a specialized end-effector. The mobile manipulator includes an autonomous mobile base, which can selflocalize in its environment with the help of on-board sensors. Further, the mobile manipulator includes an robotic arm together with a specialized self-contained end-effector, which is mounted to the robotic arm. The self-contained end-effector can include additional sensing, both for feedback from cutting and welding as well as to provide additional localization through for example, but not limited to cameras and lasers and inertial measurement units.

Contrary to the known machines and methods in the area of the invention, preferably the building element (mesh) remains static and the machine (robotic setup) moves in order to fabricate the structure. This inversion achieved through the use of an autonomous mobile manipulator significantly increases the dimensions and articulation of geometries that can be fabricated and imposes fewer restrictions on the achievable size of the structure being built. Especially it allows for an in situ production and specialised geometric and structural adaptation of the meshes, even within constraints of a building shell.

This digitally-controlled manufacturing of three-dimensional metal meshes comprises features which can be totally automated not only separately but also as a programmable sequence of operations. The present invention therefore describes a unique construction method and robotic setup (including the robotic end-effector), which provides a robust integration of all these features and which is totally automated. This advantage of total digitally-controlled automation, not present in the state of art, enables significantly enhanced geometric freedom in determining, for example, overall dimension and volume as well as formal articulation and density of metal wire meshes. This also enables to achieve differentiation of a mesh geometry locally in order to adapt the structure's geometry locally in areas where stress concentration is higher due to external loads. Currently, this combination of digitally-controlled automation and high geometric variability is especially lacking for the production of three-dimensional metal meshes, which is the subject of this invention. Using a mobile robotic platform for guiding the mentioned custom end-effector also allows to apply the method directly on the construction site and to robotically manufacture meshes with no a priori size limits.

On the most general level, the key advantage is the full automation of the process and the high flexibility with regards to non-standard geometries that can be produced without having to change the machine setup and or the overall design approach. This is possible through the aforementioned inversion of static machine and mobile building element. Whereas previously the machine setup had to change in order to accommodate varying building element geometries, now the mobile manipulator remains unaffected by the geometry of the building element due to the inherent high flexibility of the applied method and setup. Moreover, this ability to mass customize building elements allows fabricating geometries which are tailored exactly towards their specific load case or purpose, which in turn allows for significant savings in material (such as for formwork, reinforcement or concrete filling).

In its original purpose as combined concrete formwork and reinforcement the invention can be used for other concrete construction systems. Additionally the method could be used for other structural applications that depend on geometric flexibility (for example volume and shape) without having to fill the mesh with concrete or other materials. Here the focus could potentially be on fences, cages, lightweight structures or other load-bearing structures and scaffoldings.

The invention claimed is:

1. A method for producing three-dimensional, highly variable lattice or mesh structures by means of a mobile manufacturing device, wherein the mobile manufacturing device is moved on a two-dimensional plane, and manufactured by means of an end-effector, a three-dimensional lattice or mesh structure by providing wires in horizontal as well as in non-horizontal orientation and at least one of bending and connecting a plurality of these wires, the method comprising:

laying down some wires horizontally at defined vertical distances and in prescribed lengths in three-dimensional space;
   bending the laid horizontal wires at prescribed points by prescribed angles;
   grasping and feeding other wires vertically in discrete steps of varying lengths;
   controlling with the mobile manufacturing device a spatial arrangement of the horizontal wires and the vertical wires using a three-dimensional parametric model;
   forming cross-wire connections by bringing the horizontal wires and the vertical wires together;
   welding the cross-wire connections together to form cross-wire joints; and
   cutting the vertical wires at varying lengths.

2. The method for producing three-dimensional lattice or mesh structures according to claim 1, wherein at least some of the steps of the production process are digitally controlled.

\* \* \* \* \*